United States Patent
Hart et al.

(10) Patent No.: US 10,097,009 B2
(45) Date of Patent: Oct. 9, 2018

(54) METHOD AND SYSTEMS FOR MANAGING POWER SYSTEMS

(71) Applicant: General Electric Company, Schenectady, NY (US)

(72) Inventors: Patrick Hammel Hart, Ballston Lake, NY (US); Ralph Teichmann, Niskayuna, NY (US); John Guido Piccirillo, Glenville, NY (US); Honggang Wang, Shanghai (CN); Rebecca Dinan Zoracki, Ballston Spa, NY (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 283 days.

(21) Appl. No.: 14/983,004

(22) Filed: Dec. 29, 2015

(65) Prior Publication Data

US 2017/0187194 A1     Jun. 29, 2017

(51) Int. Cl.
*G06F 1/28*     (2006.01)
*H02J 4/00*     (2006.01)
(Continued)

(52) U.S. Cl.
CPC .............. *H02J 4/00* (2013.01); *G05B 19/102* (2013.01); *H02J 3/38* (2013.01);
(Continued)

(58) Field of Classification Search
CPC ........... G05F 1/66; H02J 3/1828; Y02E 40/30
(Continued)

(56) References Cited

U.S. PATENT DOCUMENTS

| 6,925,385 B2 | 8/2005 | Ghosh et al. |
| 7,315,769 B2 | 1/2008 | Balan et al. |

(Continued)

FOREIGN PATENT DOCUMENTS

| WO | 2012037249 A1 | 3/2012 |
| WO | 2014/038966 A1 | 3/2014 |

OTHER PUBLICATIONS

Kumaravel, S. et al.; "Adapted Multilayer Feedforward ANN Based Power Management Control of Solar Photovoltaic and Wind Integrated Power System"; Innovative Smart Grid Technologies (ISGT)—India, 2011 IEEE PES; Kollam, Kerala; Dec. 1-3, 2011; pp. 223-228.

(Continued)

*Primary Examiner* — Michael J Brown
(74) *Attorney, Agent, or Firm* — GE Global Patent Operation; John Darling

(57) ABSTRACT

A power system includes a first power asset include a first power source and a first power controller. The first power controller includes a first filter configured to receive an error amount at a first frequency range and a second power controller includes a second filter configured to receive the error amount at a second frequency range. The first power controller is configured to instruct the first power source to produce a first amount of power, adjust the first amount of power based on the error amount received by the first filter until the error amount received is substantially zero. When the error amount received is substantially zero, the first power controller is configured to determine a first desired operating amount of power based on the first power source, and adjust the first amount of power based on the first desired operating amount of power.

18 Claims, 5 Drawing Sheets

(51) Int. Cl.
*G05B 19/10* (2006.01)
*H02J 3/38* (2006.01)
*H02J 3/00* (2006.01)

(52) U.S. Cl.
CPC . *G05B 2219/2639* (2013.01); *H02J 2003/007* (2013.01); *Y02E 60/76* (2013.01); *Y04S 40/22* (2013.01)

(58) Field of Classification Search
USPC .................................................. 700/295, 297
See application file for complete search history.

(56) References Cited

U.S. PATENT DOCUMENTS

| | | | |
|---|---|---|---|
| 7,983,799 | B2 | 7/2011 | Bose et al. |
| 9,780,710 | B2 * | 10/2017 | Rose, Jr. ................. H02P 9/305 |
| 2003/0006613 | A1 | 1/2003 | Lof et al. |
| 2009/0251933 | A1 | 10/2009 | Angerer et al. |
| 2011/0106325 | A1 | 5/2011 | Opina, Jr. et al. |
| 2013/0245846 | A1 | 9/2013 | Bellacicco et al. |
| 2014/0175887 | A1 | 6/2014 | Shao et al. |
| 2015/0088576 | A1 | 3/2015 | Steven et al. |
| 2015/0115722 | A1 | 4/2015 | Fawzy et al. |
| 2015/0194820 | A1 | 7/2015 | Liang et al. |

OTHER PUBLICATIONS

Nasir, M. et al.; "Model Formulation and Design of an Efficient Control Algorithm for Fuel Cell Power System"; 2013 Fourth International Conference on Power Engineering, Energy and Electrical Drives (POWERENG); Istanbul; May 13-17, 2013; pp. 806-811.

Extended European Search Report and Opinion issued in connection with corresponding EP Application No. 16203682.6 dated May 3, 2017.

* cited by examiner

METHOD AND SYSTEMS FOR MANAGING POWER SYSTEMS

BACKGROUND

The field relates generally to managing power systems, and more specifically, to methods and systems for managing a plurality of power sources to provide constant power equal to demand while switching between power sources.

When generating power, power systems are designed to provide an amount of power based on demand. The power systems are configured to provide the power in the most cost efficient method possible. However, power systems also need to be able to handle sudden changes in demand.

Many power systems include multiple power assets of different types. For example, a power system may include fuel cells, batteries, gas engines, and hydroelectric power. When producing energy, these different power sources have different attributes. Some power sources are not efficient, but are very responsive and are able to respond to changes in demand quickly. Other power sources are extremely efficient, but require significant amounts of time to increase the amount of power provided. Still other power sources provide near constant amounts of power that are extremely difficult to adjust. For many power sources, the power source is more responsive to a request to decrease the amount of power than to a request to increase the amount of power.

BRIEF DESCRIPTION

In one aspect, a power system is provided. The power system includes a first power asset including a first power source and a first power controller. The first power controller is configured to instruct the first power source to produce a first amount of power and includes a first filter configured to receive an error amount at a first frequency range. The power system also includes a second power asset comprising a second power source and a second power controller. The second power controller is configured to instruct the second power source to produce a second amount of power and includes a second filter configured to receive the error amount at a second frequency range. The error amount is based on a difference between a power demand amount and a sum of the first amount of power and the second amount of power. The first power controller is configured to instruct the first power source to produce the first amount of power and increase the first amount of power based on the error amount received by the first filter until the error amount received is substantially zero. When the error amount received is substantially zero, the first power controller is configured to determine a first desired operating amount of power based on the first power source; and adjust the first amount of power based on the first desired operating amount of power.

In another aspect, a power asset is provided. The power asset includes a power source and a power controller comprising a filter configured to receive an error amount at a first frequency range, wherein the error amount is based on a difference between a power demand amount and a total power produced amount. The power controller is configured to instruct the power source to produce an amount of power and increase the amount of power based on the error amount received by said filter until the error amount received is substantially zero. When the error amount received is substantially zero, the power controller is configured to determine a desired operating amount of power based on said power source and adjust the amount of power based on the desired operating amount of power.

In yet another aspect, a method for controlling a plurality of power assets is provided. Each of the plurality of power assets produces an amount of power. The method includes determining an error amount based on a power demand amount and a total amount of power produced by the plurality of power assets. The error amount is associated with a first frequency. The method also includes selecting a first power asset of the plurality of power assets based on the first frequency, increasing or decreasing the amount of power produced by the first power asset to reduce the error amount, adjusting the amount of power produced by one of the power assets of the plurality of power assets to increase the error amount at a second frequency, selecting a second power asset based on the second frequency, and increasing the amount of power produced by the second power asset to reduce the error amount.

DRAWINGS

These and other features, aspects, and advantages of the present disclosure will become better understood when the following detailed description is read with reference to the accompanying drawings in which like characters represent like parts throughout the drawings, wherein.

Figure 1:
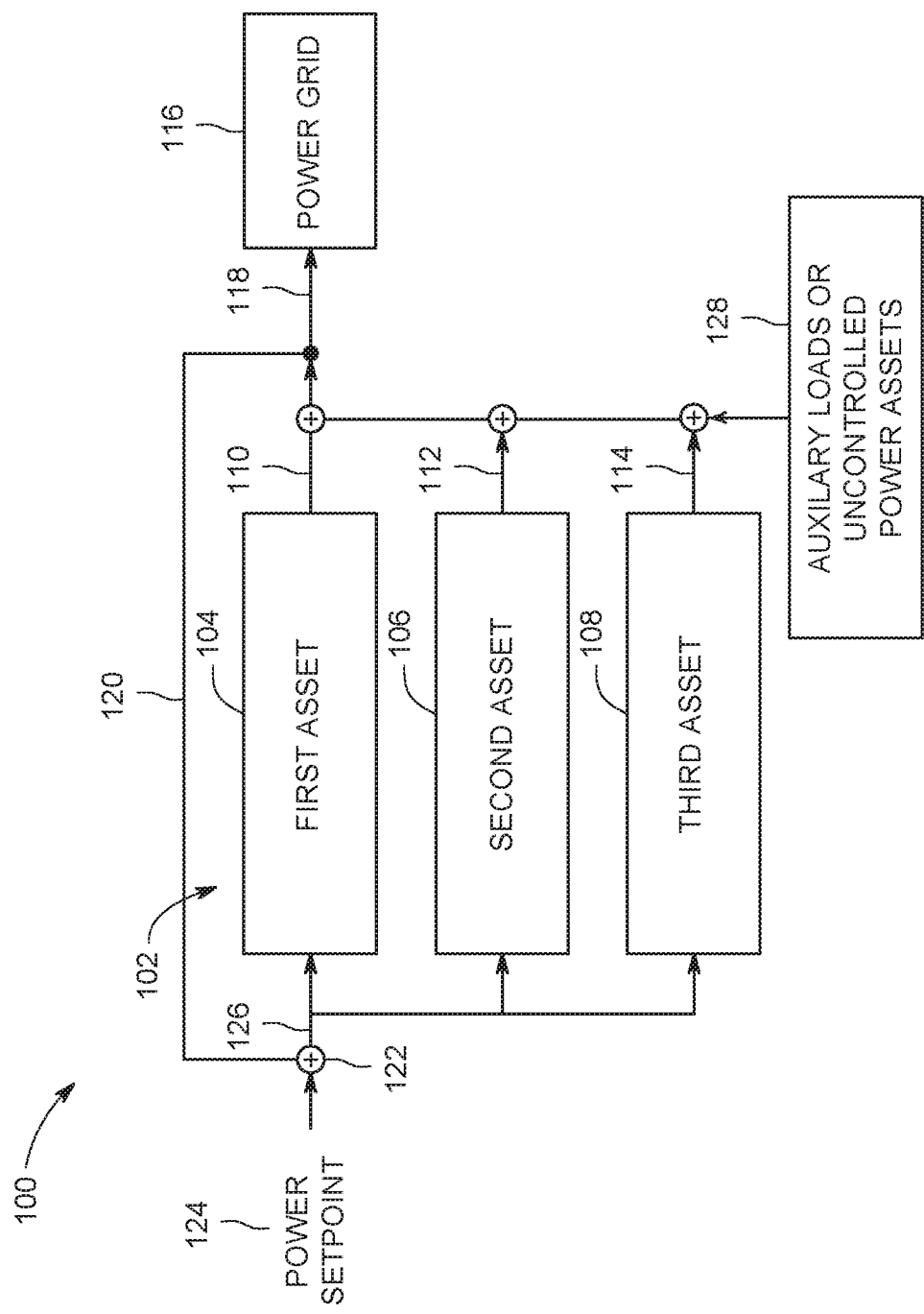
FIG. 1 is a schematic view of an exemplary power system including a plurality of power assets.

Unless otherwise indicated, the drawings provided herein are meant to illustrate features of embodiments of the disclosure. These features are believed to be applicable in a wide variety of systems comprising one or more embodiments of the disclosure. As such, the drawings are not meant to include all conventional features known by those of ordinary skill in the art to be required for the practice of the embodiments disclosed herein.

DETAILED DESCRIPTION OF THE INVENTION

In the following specification and the claims, reference will be made to a number of terms, which shall be defined to have the following meanings.

The singular forms "a", "an", and "the" include plural references unless the context clearly dictates otherwise.

"Optional" or "optionally" means that the subsequently described event or circumstance may or may not occur, and that the description includes instances where the event occurs and instances where it does not.

Approximating language, as used herein throughout the specification and claims, may be applied to modify any quantitative representation that may permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value. Here and throughout the specification and claims, range limitations may be combined and interchanged; such ranges are identified and include all the sub-ranges contained therein unless context or language indicates otherwise.

As used herein, the terms "processor" and "computer" and related terms, e.g., "processing device", "computing device", and "controller" are not limited to just those integrated circuits referred to in the art as a computer, but broadly refers to a microcontroller, a microcomputer, a programmable logic controller (PLC), an application specific integrated circuit, and other programmable circuits, and these terms are used interchangeably herein. In the embodiments described herein, memory may include, but is not limited to, a computer-readable medium, such as a random access memory (RAM), and a computer-readable non-volatile medium, such as flash memory. Alternatively, a floppy disk, a compact disc—read only memory (CD-ROM), a magneto-optical disk (MOD), and/or a digital versatile disc (DVD) may also be used. Also, in the embodiments described herein, additional input channels may be, but are not limited to, computer peripherals associated with an operator interface such as a mouse and a keyboard. Alternatively, other computer peripherals may also be used that may include, for example, but not be limited to, a scanner. Furthermore, in the exemplary embodiment, additional output channels may include, but not be limited to, an operator interface monitor.

Further, as used herein, the terms "software" and "firmware" are interchangeable, and include any computer program stored in memory for execution by personal computers, workstations, clients and servers.

As used herein, the term "non-transitory computer-readable media" is intended to be representative of any tangible computer-based device implemented in any method or technology for short-term and long-term storage of information, such as, computer-readable instructions, data structures, program modules and sub-modules, or other data in any device. Therefore, the methods described herein may be encoded as executable instructions embodied in a tangible, non-transitory, computer readable medium, including, without limitation, a storage device and a memory device. Such instructions, when executed by a processor, cause the processor to perform at least a portion of the methods described herein. Moreover, as used herein, the term "non-transitory computer-readable media" includes all tangible, computer-readable media, including, without limitation, non-transitory computer storage devices, including, without limitation, volatile and nonvolatile media, and removable and non-removable media such as a firmware, physical and virtual storage, CD-ROMs, DVDs, and any other digital source such as a network or the Internet, as well as yet to be developed digital means, with the sole exception being a transitory, propagating signal.

Furthermore, as used herein, the term "real-time" refers to at least one of the time of occurrence of the associated events, the time of measurement and collection of predetermined data, the time to process the data, and the time of a system response to the events and the environment. In the embodiments described herein, these activities and events occur substantially instantaneously.

The method and systems described herein provide for managing a power system that includes a plurality of power assets to provide power equal to demand while automatically altering the power output of the different power assets for efficiency or other desired parameters. Furthermore, the method and systems described herein allow for efficient operation of a plurality of connected power assets to rapidly respond to changes in demand. Also, the system and methods described herein are not limited to any single type of power asset or combination of power assets, but may be implemented with any power generating device that is configured as described herein. For example, the method and systems described herein may be used with batteries, gas engines, a coal fired turbines, fuel cells, nuclear generators, wind turbines, solar cells, hydroelectric generators, geothermal taps, and any other device capable of generating energy. By independently controlling each power asset over time, efficient operation of the plurality of assets contained in the power system allow for constant power while allowing the power assets to transfer the load from one asset to another.

FIG. 1 is a schematic view of an exemplary power system 100 including a plurality of power assets 102. Power system 100 includes a plurality of power assets 102 including a first asset 104, a second asset 106, and a third asset 108. In the exemplary embodiment, each power asset 104, 106, and 108 outputs an amount of power 110, 112, and 114, respectively. Power system 100 outputs power to a power grid 116. A total amount of power 118 outputted to power grid 116 is the combined amounts of power 110, 112, and 114. Power system 100 also includes a power feedback loop 120, wherein power feedback loop 120 communicates total amount of power 118 to a power system controller 122. Power system controller 122 receives total amount of power 118 from power feedback loop 120 and a power setpoint 124 (also known as power demand amount). In some embodiments, power setpoint 124 is set by a utility associated with power grid 116. Power system controller 122 calculates an error amount 126 based on the difference between total amount of power 118 and power setpoint 124. Error amount 126 drives power outputs 110, 112, and 114 of power assets 104, 106, and 108. In the exemplary embodiment, error amount 126 is the amount of additional power needed to be generated to meet power setpoint 124. In the exemplary embodiment, power system 100 does not output more power than needed by power setpoint 124.

While only three power assets are shown (104, 106, and 108), system 100 could include any number of power assets combined together to contribute power to meet power setpoint 124. In some embodiments, system 100 also includes auxiliary or uncontrolled loads 128. Auxiliary loads would be power required to run the components at a power plant that houses one or more of the plurality of power assets 102. Uncontrolled power sources can add a disturbance to power assets 110, 112, & 114.

Figure 2:
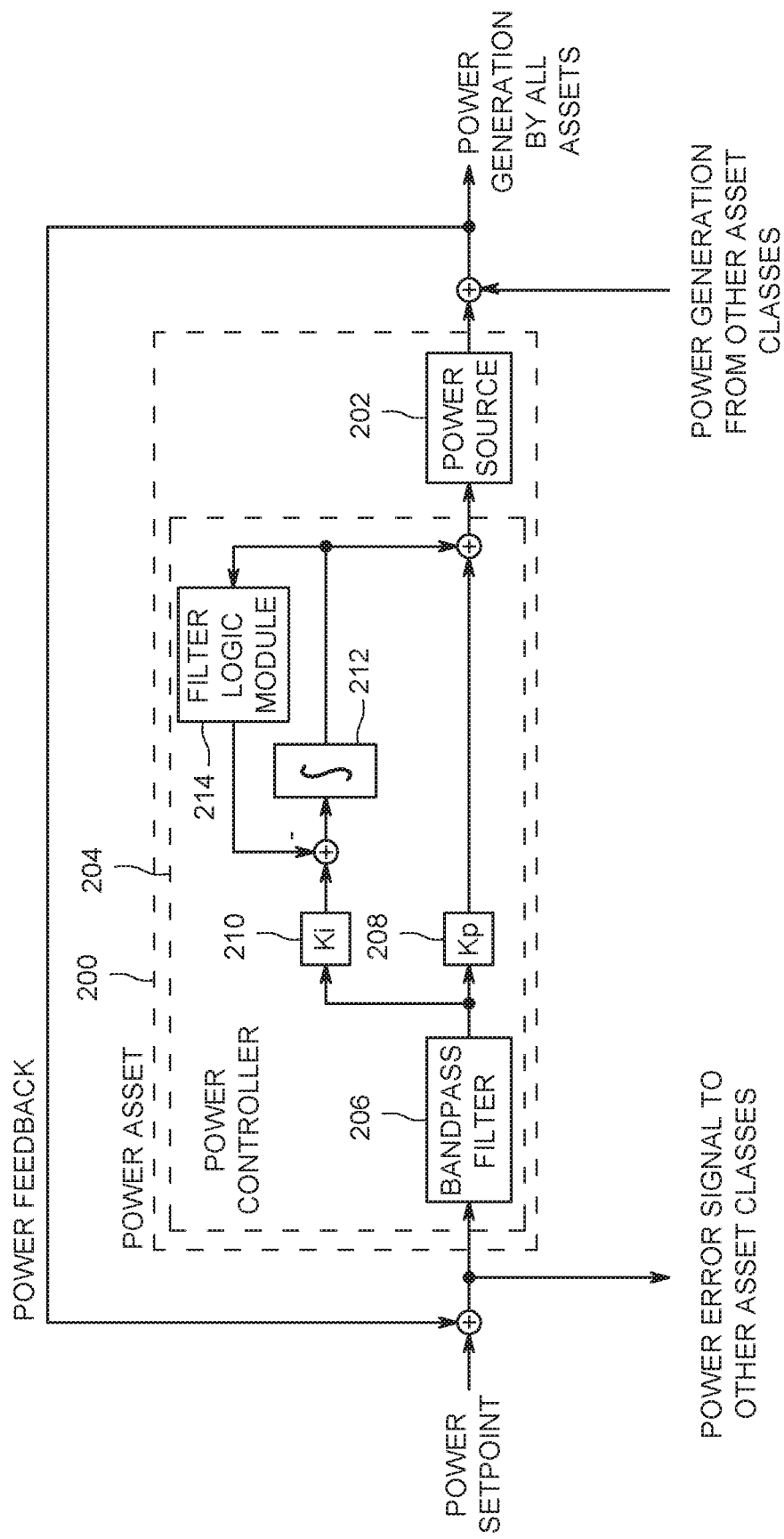
FIG. 2 is a schematic illustration of an exemplary power asset such as the power assets shown in FIG. 1.

FIG. 2 is a schematic illustration of an exemplary power asset 200 such as power assets 104, 106, and 108 shown in FIG. 1. Power asset 200 includes a power source 202 and a power controller 204. In the exemplary embodiment, power source 202 generates electrical energy. Power source 202 includes, but is not limited to, a battery, a gas engine, a coal fired turbine, a fuel cell, a nuclear generator, a wind turbine, solar cells, a hydroelectric generator, a geothermal tap, and any other device capable of generating energy. In some embodiments, power source 202 includes or is a virtual power device, such as one created through a demand response event or a grouping of power assets that are not co-located, but are controlled as a single asset. Each different power source 202 includes several attributes or parameters that control the operation of the corresponding power source 202. For example, batteries are quick to respond to changes in power output and can be used when a rapid increase in power is required. However, batteries drain and have to be recharged. Generally, batteries cannot be used for extended periods of time. Another example is gas engines, which are capable of providing power for periods of time longer than batteries, but require an amount of time to power up. A third example is fuel cells, which provide efficient power over long periods of time, but require significant amounts of time to increase power output. In the exemplary embodiment, the fuel cells are solid oxide fuel cells. Other potential attributes include the condition of the power source 202, past operation of the power source 202, and other attributes or parameters as desired by the operators of the power source 202.

Power controller 204 controls an amount of energy produced by power source 202. In the exemplary embodiment, power controller 204 includes a bandpass filter 206, controller gains Kp 208 and Ki 210, an integrator 212, and a filter logic module 214. Bandpass filter 206 is configured to receive an error amount 126 (shown in FIG. 1) when the error amount 126 is at a specific frequency. More specifically, each bandpass filter 206 in each power controller 204 is configured to only receive the error amount 126 at a different frequency. The frequency is related to the change in the error amount 126 over a period of time. In one example, the bandpass filter 206 associated with first asset 104 is set to accept the error amount 126 when the error amount changes at a rate of 1 MW per second, while the bandpass filter 206 associated with second asset 106 is set to accept the error amount 126 when the error amount changes at a rate of 1 MW per minute. In this example, the bandpass filter 206 associated with third asset 108 (shown in FIG. 1) is set to accept the error amount 126 when the error amount changes at a rate of 1 MW per hour. When the frequency of the error amount 126 is outside of the acceptable range for the bandpass filter 206, the bandpass filter 206 prevents the error amount 126 from affecting the corresponding power controller 204. In some embodiments, acceptable ranges overlap for different assets. In other embodiments, bandpass filter 206 is a high pass filter or a low pass filter. Ones skilled in the art will understand that bandpass filter 206 is an example filter only and other types of filters may be used to allow the disclosure to function as described herein.

When bandpass filter 206 accepts an error amount 126, the error amount 126 is transmitted to controller gains Kp 208 and Ki 210. Controller gains Kp 208 and Ki 210 are each tuned in order to provide the desired response from power source 202. For example, if error amount is 10 MW, controller gains Kp 208 and Ki 210 may each be set at 0.1. This yields a 1 MW initial step in power output of power source 202, with an initial ramp rate of 1 MW/second that diminishes as the observed power error 126 approaches 0 MW. In the exemplary embodiments, Kp 208 and Ki 210 are based on attributes of power source 202. In one example, Kp 208 and Ki 210 are configured to slowly or quickly increase the power output of power source 202.

Integrator 212 tracks the amount of power produced by power source 202. Using the above example, Kp 208 and Ki 210 are both set to 0.1 and the output of each is 1 MW. Power source 202 was producing 20 MW and a new Power Setpoint of 30 MW is received. Integrator 212 receives the 1 MW output and increases its setting to 21 MW. The output of integrator 212 begins ramping its output at a rate of 1 MW/Second and its controller output is combined with the output of Kp 208. After one second, the combined power controller output is a total of 22 MW. Power controller 204 instructs power source 202 to produce 22 MW of power. If the error amount 126 is not reduced to zero and the error amount is still within the frequency accepted by the power controller's bandpass filter 206, power controller 204 will receive an error amount 126 of 8 MW and the process will repeat.

Filter logic module 214 controls the operation of power source 202 to reduce the amount of power produced by power source 202 and transfer the power production to another power source 202. Filter logic module 214 is configured to reduce the power produced by power source 202 at a certain rate. By producing less power, error amount 126 increases. Filter logic module 214 controls the frequency for the increase in error amount 126. Thereby controlling which bandpass filter 206 accepts error amount 126 generated by filter logic module 214. However, filter logic module 214 is configured so that the error amount 126 generated will not be accepted by the bandpass filter 206 associated with the filter logic module's power controller 204. In some embodiments, filter logic module 214 is configured to transfer the power generation to a specific power asset 200 by setting the frequency of the error amount 126 to the frequency range of the other power asset's bandpass filter 206. In other embodiments, filter logic module 214 transfers the power generation away from its power source 202, but does not know which other power asset 200 will pick up the slack. In some embodiments, filter logic module 214 is configured to allow power source 202 to operate at a certain output level for a certain amount of time before starting to reduce power source's output. In some embodiments, Filter logic module 214 is configured to reduce the operation of power source 202 in accordance with any desired operating parameters, methodologies, or other business rules. An example includes, but is not limited to, where the optimal power setpoint of one asset is defined to be fraction of another power asset. In another example, a supervisory controller defines optimal setpoints for each asset based on the most efficient operating conditions, or lowest cost operation. Yet another example includes preparing system 100 for particular scenarios, i.e. always making sure the battery is charged enough to handle unscheduled grid outages.

In some embodiments, filter logic module 214 is configured to reduce the power output of power source 202 to a desired operating amount of power. For example, for batteries the desired operating amount of power is zero. The rate of reduction of power output for batteries is set on operating parameters of the batteries, such as the amount of charge in the batteries, the length of time that the batteries are able to produce the desired charge, and the current remaining life time of the batteries.

In the exemplary embodiment, first asset 104 is a battery, second asset 106 is a gas engine, and third asset 108 is a fuel cell. In other embodiments, each power asset 104, 106, and 108 is a different type of power asset. Plurality of power assets 102 includes, but is not limited to, battery, gas engine, fuel cell, nuclear power, wind turbines, solar cells, hydroelectric, and geothermal. In some embodiments, each power asset 104, 106, and 108 is located at the same location. In other embodiments power assets 104, 106, and 108 are spread out in different locations, potentially miles apart.

Figure 3:
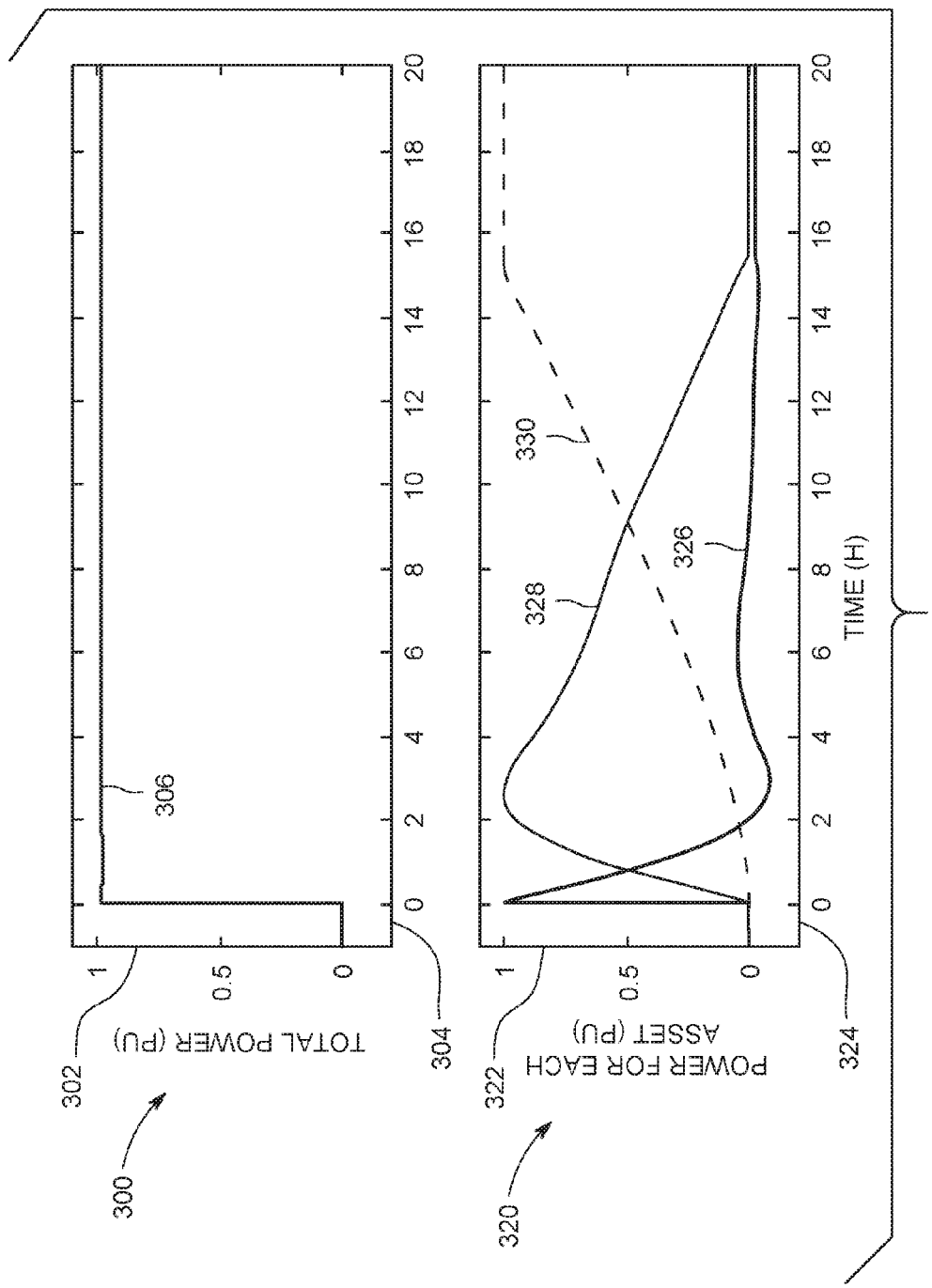
FIG. 3 is an illustration of an exemplary scenario for an increase in demand using power system shown in FIG. 1.

FIG. 3 is a graphical view of the power output of a power system 100 (shown in FIG. 1) over a period of time during a scenario. FIG. 3 includes a total power output graph 300 that includes a y-axis 302 defining a total power output 118 (shown in FIG. 1) for system 100 in Power Units (PU). Graph 300 also includes an x-axis 304 defining time in hours. Also, graph 300 includes a power output versus time curve 306. In graph 300, the power demand increases by 1 Power Unit (PU) from 0 to 1 at time T=0. Graph 300 illustrates the total amount of power produced by power system 100 over time, where curve 306 shows the change in power.

FIG. 3 includes a power output of multiple assets graph 320 that includes a y-axis 322 defining a power output 110, 112, and 114 (shown in FIG. 1) for each of first asset 104, second asset 106, and third asset 108 (all shown in FIG. 1). Graph 320 also includes an x-axis 324 defining time in hours, which is inline with x-axis 304 in graph 300. Also, graph 320 includes a plurality of power output versus time curves 326, 328, and 330. The leftmost curve 326 represents power output 110 of first asset 104 over time. The middle curve 328 represents power output 112 of second asset 106 over time. The rightmost curve 330 represents power output 114 of third asset over time.

In the exemplary embodiment, first asset 104 is a battery, second asset 106 is a gas engine, and third asset 108 is a fuel cell, such as a solid oxide fuel cell. As shown in graph 300, total power output 306 for power system 100 increases from 0 PU to 1 PU immediately. In graph 320, power output 326 from battery 104 increases immediately to meet the required demand of 1 PU. Power output 326 from battery 104 decreases as power output 328 from gas engine 106 increases. As shown in graph 300, during this transition total output power 306 does not change. Throughout graph 320, power output 330 from fuel cell 108 slowly increases until fuel cell 108 is providing effectively all of the power required for total power output 306. Additionally, battery 104 is shown to produce negative power for a period of time while battery 104 is recharging.

When power demand increases from 0 PU to 1 PU, an error amount 126 of 1 PU is generated. Bandpass filter 206 associated with the battery 104 accepts the error amount 126 due to the high frequency, where the error amount 126 changes from 0 to 1 very quickly. Filter logic module 214 associated with the battery 104 reduces power at an error rate of 0.5 PU an hour. At this error rate, the gas engine 106 quickly increases power output at close to the same rate, while fuel cells 108 slowly increase at an extremely slow but constant rate. In the exemplary embodiment, bandpass filter 206 for both gas engine 106 and fuel cell 108 are be set to the same frequency. Each time gas engine 106 reduces its output, fuel cell 108 slowly increases its output and gas engine 106 continues to make up the remainder of the demanded power. The difference in rate of increase between the gas engine 106 and the fuel cell 108 is potentially based on differences in controller gains Kp 208 and Ki 210 (both shown in FIG. 2) corresponding to each power source.

In scenario illustrated in FIG. 3, the battery 104 is configured to immediately output power based on increased demand while the gas engine 106 fires up. Then fuel cells 108 slowly ramp up to meet increased demand while gas engine 106 covers the difference between the amount of power produced by the fuel cell 108 and the demand amount. In other scenarios, different configurations of power assets have different behaviors. In another scenario, the plurality of power assets include a plurality of batteries that are cycled through before transferring power to fuel cells which recharge them. In an additional scenario, the filter logic module for the gas engine knows that maintenance is scheduled to be performed on the gas engine on a certain day at a certain time and power down the gas engine in preparation for that.

Figure 4:
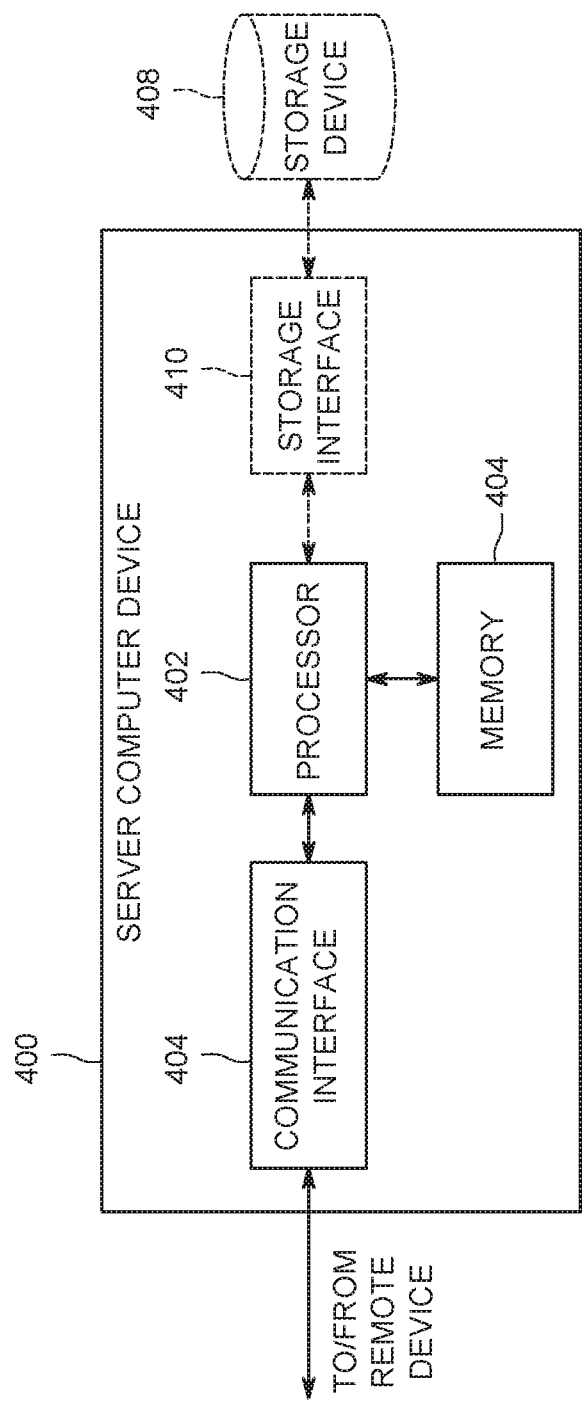
FIG. 4 is a schematic view of an exemplary configuration of power source controller 204 shown in FIG. 2.

FIG. 4 is a schematic view of an exemplary configuration of power source controller 204 shown in FIG. 2. More specifically, server computer device 400 may include, but is not limited to, power system controller 122 (shown in FIG. 1) and power controller 202 (shown in FIG. 2). Server computer device 400 also includes a processor 402 for executing instructions. Instructions may be stored in a memory area 404. Processor 402 may include one or more processing units (e.g., in a multi-core configuration).

Processor 402 is operatively coupled to a communication interface 406 such that server computer device 400 is capable of communicating with a remote device, such as power source 202 (shown in FIG. 2), power controller 204 (shown in FIG. 2), power system controller 122 (shown in FIG. 1), or a client system (not shown). For example, communication interface 406 may receive an error amount 126, as illustrated in FIG. 1.

Processor 402 is also operatively coupled to a storage device 408. Storage device 408 is any computer-operated hardware suitable for storing and/or retrieving data, such as, but not limited to, data associated with a database (not shown). In some embodiments, storage device 408 is integrated in server computer device 400. For example, server computer device 400 may include one or more hard disk drives as storage device 408. In other embodiments, storage device 408 is external to server computer device 400 and is accessed by a plurality of server computer device 400. For example, storage device 408 may include a storage area network (SAN), a network attached storage (NAS) system, and/or multiple storage units such as hard disks and/or solid state disks in a redundant array of inexpensive disks (RAID) configuration.

In some embodiments, processor 402 is operatively coupled to storage device 408 via a storage interface 410. Storage interface 410 is any component capable of providing processor 402 with access to storage device 408. Storage interface 410 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing processor 402 with access to storage device 408.

Processor 402 executes computer-executable instructions for implementing aspects of the disclosure. In some embodiments, processor 402 is transformed into a special purpose microprocessor by executing computer-executable instructions or by otherwise being programmed. For example, processor 402 is programmed with instructions as described further below.

Figure 5:
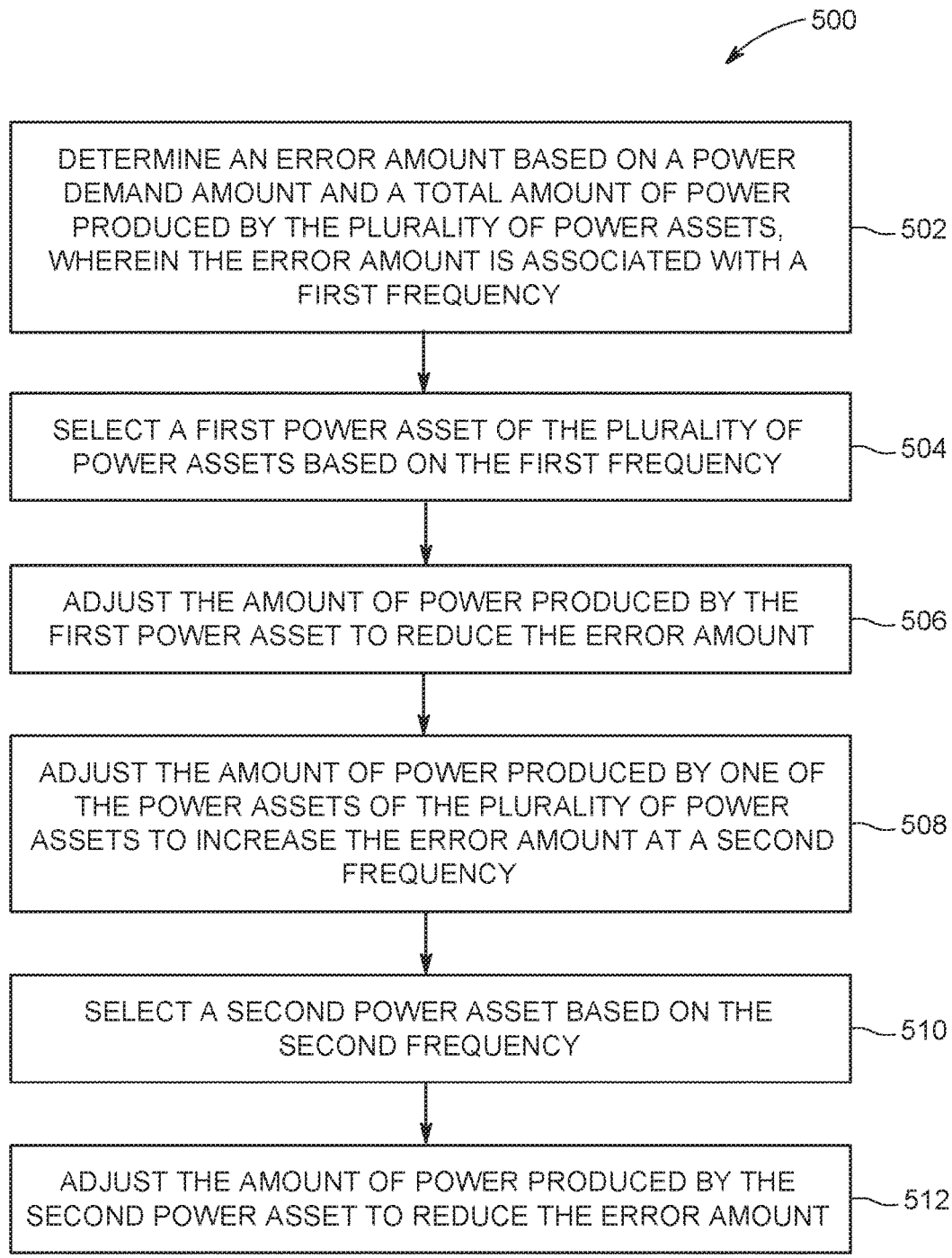
FIG. 5 is a flow chart of an exemplary process of managing the power system shown in FIG. 1.

FIG. 5 is a flow chart of an exemplary process 500 of managing power system 100 shown in FIG. 1. In the exemplary embodiment, process 500 is performed in real-time by power system controller 122 (shown in FIG. 1) and various power controllers 204 (shown in FIG. 2) associated with the plurality of power assets 102 shown in FIG. 1.

Power system controller 122 determines 502 error amount 126 based on a power demand amount 124 and a total amount of power 118 produced by the plurality of power assets 102 (all shown in FIG. 1). Error amount 126 is associated with a first frequency. First power asset 104 of the plurality of power assets 102 selects 504 itself based on the first frequency. Power controller 204 of first power asset 104 adjusts 506 the amount of power 110 (shown in FIG. 1) produced by first power asset 104 to reduce error amount 126. In the exemplary embodiment, the amount of power 110 is increased to reduce error amount 126, however, other adjustments are feasible.

Power controller 204 of a power asset 200 (shown in FIG. 2) adjusts 508 amount of power produced by power assets 200 of the plurality of power assets 102 to increase error amount 126 at a second frequency. In the exemplary embodiment, the amount of power is reduced to increase error amount 126, however, other adjustments are feasible. Power controller 204 of second power asset 106 (shown in FIG. 1) selects 510 itself based on the second frequency. Power controller 204 of first second asset 106 adjusts 512 the amount of power 112 (shown in FIG. 1) produced by second power asset 106 to reduce error amount 126.

In the exemplary embodiment, the above described process 500 is an iterative process and will repeat as error amount 126 and power demand amount 124 change. In some embodiments, desired operating parameters, methodologies, or other business rules will modify the adjustments 506, 508, and 512 of power outputs. These adjustments 506, 508, and 512 may be either increases or decreases and may change in magnitude. While the system 100 may reach a steady state as is shown in FIG. 4, process 500 is potentially always adjusting the output of the plurality of power assets 102.

The above-described method and system provide for managing a power system that includes a plurality of power assets to provide power equal to demand while automatically altering the power output of the different power assets for efficiency or other desired parameters. Furthermore, the method and systems described herein allow for efficient operation of a plurality of connected power assets to rapidly respond to changes in demand. Also, the system and methods described herein are not limited to any single type of power asset or combination of power assets, but may be implemented with any power generating device that is configured as described herein. For example, the method and systems described herein may be used with batteries, gas engines, a coal fired turbines, fuel cells, nuclear generators, wind turbines, solar cells, hydroelectric generators, geothermal taps, and any other device capable of generating energy. By independently controlling each power asset over time, efficient operation of the plurality of assets contained in the power system allow for constant power while allowing the power assets to transfer the load from one asset to another.

An exemplary technical effect of the methods, systems, and apparatus described herein includes at least one of: (a) rapidly responding to changes in power demand; (b) providing constant power output while changing between power sources; (c) transferring power generation responsibilities between power sources based on efficiency or other operational parameters of those power sources; and (d) independently operating each power source while still meeting power demand.

Exemplary embodiments of method and systems for monitoring a dynamic system are described above in detail. The method and systems described herein are not limited to the specific embodiments described herein, but rather, components of systems or steps of the methods may be utilized independently and separately from other components or steps described herein. For example, the methods may also be used in combination with multiple different power systems, and are not limited to practice with only the power systems as described herein. Additionally, the methods may also be used with other power sources, and are not limited to practice with only the power sources as described herein. Rather, the exemplary embodiments may be implemented and utilized in connection with many other power generating devices to be operated as described herein.

Although specific features of various embodiments may be shown in some drawings and not in others, this is for convenience only. In accordance with the principles of the systems and methods described herein, any feature of a drawing may be referenced or claimed in combination with any feature of any other drawing.

Some embodiments involve the use of one or more electronic or computing devices. Such devices typically include a processor, processing device, or controller, such as a general purpose central processing unit (CPU), a graphics processing unit (GPU), a microcontroller, a reduced instruction set computer (RISC) processor, an application specific integrated circuit (ASIC), a programmable logic circuit (PLC), a field programmable gate array (FPGA), a digital signal processing (DSP) device, and/or any other circuit or processing device capable of executing the functions described herein. The methods described herein may be encoded as executable instructions embodied in a computer readable medium, including, without limitation, a storage device and/or a memory device. Such instructions, when executed by a processing device, cause the processing device to perform at least a portion of the methods described herein. The above examples are exemplary only, and thus are not intended to limit in any way the definition and/or meaning of the term processor and processing device.

This written description uses examples to disclose the embodiments, including the best mode, and also to enable any person skilled in the art to practice the embodiments, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A power system comprising:
a first power asset comprising a first power source and a first power controller, wherein said first power controller is configured to instruct said first power source to produce a first amount of power, wherein said first power controller comprises a first filter configured to receive an error amount at a first frequency range; and
a second power asset comprising a second power source and a second power controller, wherein said second power controller is configured to instruct said second power source to produce a second amount of power, wherein said second power controller comprises a second filter configured to receive the error amount at a second frequency range, wherein the error amount is based on a difference between a power demand amount and a sum of the first amount of power and the second amount of power, and wherein said first power controller is configured to:
instruct said first power source to produce the first amount of power;
adjust the first amount of power based on the error amount received by said first filter until the error amount received is substantially zero; and
when the error amount received is substantially zero:
determine a first desired operating amount of power based on said first power source; and
adjust the first amount of power based on the first desired operating amount of power, wherein said first power controller is configured to adjust the first amount of power based on the first desired operating amount of power to adjust the error amount at the second frequency range.

2. The power system in accordance with claim 1, wherein said second power controller is configured to:
instruct said second power source to produce the second amount of power;

adjust the second amount of power based on the error amount received by said second filter until the error amount received is substantially zero; and when the error amount received is substantially zero:
determine a second desired operating amount of power based on said second power source; and
adjust the second amount of power based on the second desired operating amount of power.

3. The power system in accordance with claim 1, wherein the first frequency range and the second frequency range do not overlap.

4. The power system in accordance with claim 1 further comprising a third power asset comprising a third, power source and a third power controller configured to instruct said third power source to produce a third amount of power wherein said first power controller comprises a third filter configured to receive an error amount at a third frequency range, and wherein the error amount is based on the sum of the first amount of power, the second amount of power, and the third amount of power.

5. The power system in accordance with claim 1, wherein said first power source is at least one of a battery, a gas engine, a coal fired turbine, a fuel cell, a nuclear generator, a wind turbine, solar cells, a hydroelectric generator, and a geothermal tap.

6. The power system in accordance with claim 1, wherein the first desired operating amount of power is based on at least one of one or more operating parameters of said first power source and one or more business rules.

7. The power system in accordance with claim 1, wherein said first power controller is further configured to adjust the first amount of power at a rate based on one or more operating parameters of said first power source.

8. The power system in accordance with claim 1, wherein a frequency associated with the error amount is based on a rate of change of the error amount over time.

9. The power system in accordance with claim 1 further comprising a plurality of power assets which produce a plurality of amounts of power and wherein the error amount is based on the difference between the demand amount and a total of the plurality of amounts of power.

10. The power system in accordance with claim 1, wherein at least one of said first power asset and said second power asset is a solid oxide fuel cell.

11. A first power asset comprising:
a power source; and
a power controller comprising a filter configured to receive an error amount at a first frequency range, wherein the error amount is based on a difference between a power demand amount and a total power produced amount including power produced by the first power asset and a second power asset, wherein said power controller is configured to:
instruct the power source to produce an amount of power;
adjust the amount of power based on the error amount received by said filter until the error amount received is substantially zero; and when the error amount received is substantially zero:
determine a desired operating amount of power based on said power source; and
adjust the amount of power based on the desired operating amount of power, wherein said power controller is configured to adjust the error amount of power based on the desired operating amount of power to adjust the error amount at a second frequency range.

12. The first power asset in accordance with claim 11, wherein the first frequency range and the second frequency range do not overlap.

13. The first power asset in accordance with claim 11, wherein the power source is at least one of a battery, a gas engine, a coal fired turbine, a fuel cell, a nuclear generator, a wind turbine, solar cells, a hydroelectric generator, and a geothermal tap.

14. The first power asset in accordance with claim 11, wherein the desired operating amount of power is based on at least one of one or more operating parameters of the power source and one or more business rules.

15. The first power asset in accordance with claim 11, wherein said power controller is further configured to adjust the amount of power at a rate based on one or more operating parameters of said first power source.

16. The first power asset in accordance with claim 11, wherein said power controller is further configured to decrease the first amount of power at a rate based on one or more operating parameters of said first power source.

17. The first power asset in accordance with claim 11, wherein a frequency associated with the error amount is based on a rate of change of the error amount over time.

18. The first power asset in accordance with claim 11, wherein said second power asset is a solid oxide fuel cell.

* * * * *